March 25, 1952     C. JUHOLA     2,590,180

VOLTAGE REGULATION SYSTEM

Filed Jan. 10, 1947

Inventor
Carl Juhola
By his Attorney

Patented Mar. 25, 1952

2,590,180

UNITED STATES PATENT OFFICE 2,590,180

VOLTAGE REGULATION SYSTEM

Carl Juhola, Lynn, Mass., assignor to United Shoe Machinery Corporation, Flemington, N. J., a corporation of New Jersey Application January 10, 1947, Serial No. 721,300

1 Claim. (Cl. 321—40)

This invention relates to voltage regulating apparatus and more particularly to the regulation of the output voltage of a phase controlled rectifier device of the type in which the rectified output voltage may be determined in accordance with the phase relation between an alternating control voltage and an alternating current to be rectified. The preferred type of rectifiers for use in this invention are vapor- or gas-filled vacuum tubes, such as the type referred to as "thyratron," in which the phase of the control voltage, as applied to the grid of the tube, relative to the anode voltage will determine the average amount of rectification of the tube by causing it to become conductive at a controlled point during the positive half cycle of the anode-voltage wave.

In one former proposal, regulation was achieved by a method in which the grid voltage was given a constant phase displacement relative to the anode voltage, and an effective variable phase displacement by the addition to the alternating grid-voltage wave of a variable bias voltage which raised and lowered such wave in accordance with variations of the rectified voltage. This amounted to producing an effective phase shift of the grid voltage. In other proposals, regulation was achieved by producing an actual phase shift, as by means of a phase-shifting network or a variable-phase transformer involving the use of polyphase stator windings, for producing a rotating field, and a rotor winding which may be selectively positioned to produce an alternating voltage of selected phase. Such devices as these usually required mechanical controls.

In general, methods relying on an actual phase shift of the grid voltage have been found to be preferable over those methods in which the effective phase is shifted. The reason for this lies in the possibility of a more positive control over the cyclic conduction point of the tube in the first-named methods where, at the intersection of the grid-voltage wave and the critical conduction voltage wave, viewed graphically, a large acute angle may be formed between the two waves at all values of phase shift through a range of substantially 180°. This latter is not feasible in methods employing an effective phase shift because there the angle formed between the grid voltage wave and the critical conduction voltage wave at their intersection will be small at one or more points through the range of phase shift, if it be desired to effect this through a range of 180°. There will thus be uncertainty in the conduction point of the tube, which will vary with slight fluctuations in amplitude of either of the waves.

However, while preferable, the actual phase shift system of control as a means of providing voltage regulation has involved certain problems among which are the provision of a satisfactory wholly electrical arrangement for shifting the phase of the grid voltage wave and at the same time, providing a regulated output voltage which will be adjustable over a wide range of voltage from substantially zero to a large value. Important uses of a voltage regulated rectifier system having these features lie in the field of highfrequency electronic heating, as in supplying direct current to a vacuum tube oscillator used in producing high-frequency power which must be carefully controlled in magnitude.

An object of the invention is to provide an improved voltage-regulating device, operating upon the principle of actual phase shift of grid voltage, as set forth in principle above, which will, by means wholly electrical, produce said phase shift in response to slight variations in the voltage to be regulated. A further object is to provide a device of this character in which the voltage to be regulated may be adjusted over a wide range of values without altering the effectiveness of said device in regulating.

A further object of the invention is to devise voltage regulating apparatus of the type described, in the operation of which the phase shift of the grid voltage relative to the anode voltage of the rectifier tube is variable through nearly 180°, if need be, in response to variations in the voltage to be regulated, whether such variations occur by the selection of a new voltage to be regulated or by circuit effects such as changes in voltage of the alternating current supply or variations in loading of the rectifier tube.

In accordance with these objects, invention is to be found in a system of regulating the output voltage of a phase-sensitive rectifier, embodying a phase-control circuit, a saturable reactor having a reactor winding of variable inductance embodied in said circuit, and a saturating winding adapted for the variation of said inductance in accordance with variations in saturating current flowing through said saturating winding, and means for effecting variations in said saturating current in response to variations in the voltage to be regulated.

In another feature of the invention, the saturating current is supplied by an amplifier tube which is controlled by variations in the voltage to be regulated and which is provided with anode voltage and cathode bias, or reference, voltage from a constant-voltage source independent of the rectifier circuit and the voltage to be regulated. In the illustrated embodiment of this feature, a resistance-divider network is connected across the rectifier output terminals, said network including a fixed resistor and a variable resistor, and the voltage across the variable resistor is applied to the control grid of said amplifier tube. The adjustment of said variable resistance provides a means of selecting the magnitude of said rectifier voltage to be regulated.

These and other objects, features and advantages of the invention, including various novel aspects of its construction and operation, will now be more fully described with reference to the drawings, in which Fig. 1 is a schematic diagram of a regulated power supply employing a preferred embodiment of the invention;

Fig. 2b is a voltage-time graph showing the effect on the conduction of the rectifier tube with the phase relationships illustrated vectorially in Fig. 2a;

Figure 2A:
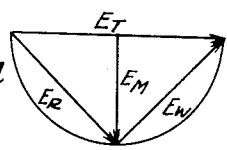
Fig. 2a is a vector diagram showing the effect of the saturable reactor of a phase control circuit illustrated in Fig. 1 in shifting the phase of the grid voltage applied to the rectifier tube.
Figure 2B:
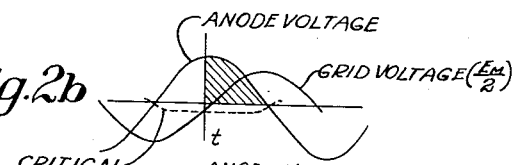

Figs. 3a, 4a, and 3b, 4b respectively illustrate two vector diagrams and the corresponding two voltage-time graphs for different phase relationships than those similarly indicated in Figs. 2a and 2b.

Figure 1:
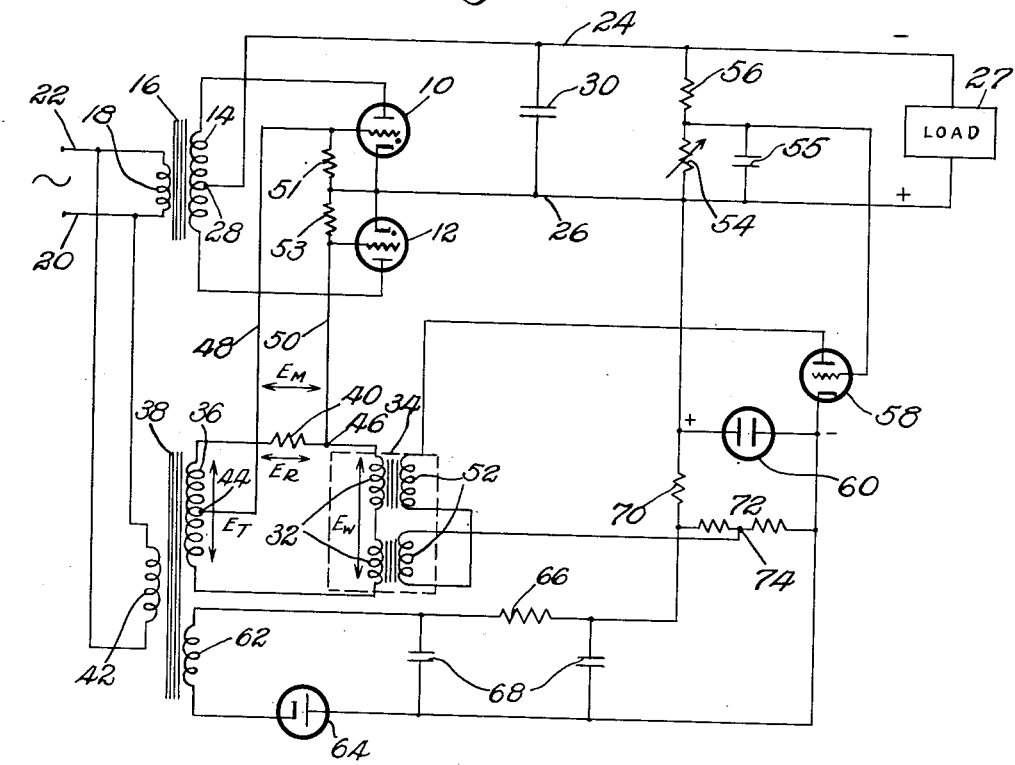

With reference to Fig. 1 there is shown a regulated power supply embodying push-pull-connected Thyratron rectifier tubes 10 and 12 having anodes connected to the terminals of a secondary winding 14 of a supply transformer 16. The primary winding 18 of the transformer 16 is supplied with alternating current from the supply mains 20 and 22. The rectified output of the rectifiers 10 and 12 appears across the direct current lines 24 and 26 with negative and positive polarity, respectively, for application to a load device 27 such as a high frequency oscillator or other direct current load. The circuit is arranged in the customary manner for full wave rectifiers, the line 24 being connected to a mid-tap 28 of the secondary 14 and the line 26 to the commonly connected cathodes of rectifier tubes 10 and 12. The direct voltage applied to the load 27 may be filtered, if filtering is desired, by means of a filter condenser 30 or by any other suitable means.

In order to control the voltage between the lines 24 and 26, the control grids of the thyratrons 10 and 12 are impressed with respectively out-of-phase voltages the phasing of which is controlled relative to that of the anode voltages of the tubes 10 and 12 thereby to control the period of conduction of each tube cyclically. Variation in phase of the grid voltages of the tubes 10 and 12 is effected, in accordance with the invention, with the aid of a phase-control circuit embodying a variable inductance element comprising the reactor winding of a saturable reactor. In Fig. 1 is shown such a control circuit which includes a reactor winding 32 of a saturable reactor 34, a transformer secondary 36 of a transformer 38 and a resistor 40, arranged in series. Alternating voltage is applied to the circuit by means of a primary winding 42 of a transformer 38 which is connected to the alternating current supply mains 20 and 22. The control grids of the thyratrons 10 and 12 are connected respectively to the output vertices which comprise a center tap 44 of the secondary 36 and a point 46 between the resistor 40 and the upper terminal of the reactor winding 32, the connections being through the leads 48 and 50 respectively. The phase of the alternating voltage applied to the leads 48 and 50 is determined by the inductive reactance of the reactor winding 32 which may be controlled by means of a direct current passed through a saturating winding 52 of the saturable reactor 34. Saturable reactors of the type useful with the invention operate upon the basic principle that the permeability of a magnetic core of such reactors changes with variations in magnetization level. By fairly saturating the core to a favorable point, as by means of the flow of current in a saturating winding, relatively slight variations in such flow of current will effect considerable changes in the permeability of the core and hence in the inductive reactance of an auxiliary or reactor winding wound on the core. In the illustrated type of saturable reactor, separate magnetic cores are employed which individually carry the two halves of the saturating winding and the reactor winding. The two halves of the saturating winding are connected in series, with reverse polarity, as shown. This prevents inducing a net alternating voltage in the saturating winding 52 proper by virtue of the transformer action of the saturable reactor 34, the reactor winding 32 acting as the transformer primary energized, in this instance, by means of current flowing in the secondary 36 of the transformer 38.

Figure 3A:
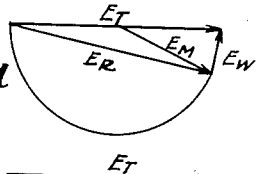
Figure 4A:
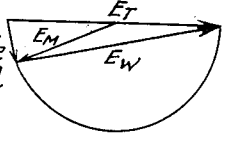

The phase-shifting effect of the control circuit just described may be further illustrated by reference to Figs. 2a, 3a and 4a which are vector diagrams of the several voltages appearing in the circuit for different values of inductance of the reactor winding 32. In these figures the voltage $E_T$ of the transformer secondary 36, which, in passing, may be considered to be in phase with the anode voltage of one of the rectifier tubes 10, 12 is represented as a horizontal vector forming the diameter of a semi-circle. The voltages developed across the resistor 40 and the reactor winding 32 are represented respectively as vectors $E_R$ and $E_W$ and they are always at right angles with relation to each other. The point of intersection of these vectors $E_R$ and $E_W$ lies on and moves around the semi-circle as the inductive reactance of the winding 32 varies. The center tap 44 of the transformer secondary 36 is at a potential represented by the mid-point of the vector $E_T$, the center of the semi-circle, and the potential at point 46, between the resistor 40 and the reactor winding 32, lies at the intersection of the vectors $E_R$ and $E_W$. Therefore the voltage applied to the grids of the thyratrons 10 and 12 may be represented by the vector $E_M$ which may be varied through substantially 180° by varying the inductive reactance of the reactor winding 32 from a very small value to a very large value. By employing equal grid resistors 51 and 53 the resulting individual grid voltages of the rectifier tubes 10 and 12 are one-half of the voltage $E_M$.

Figure 3B:
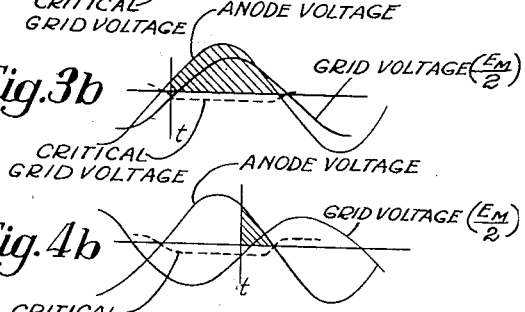
Figure 4B:
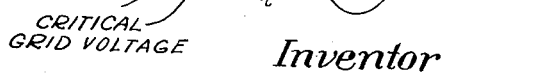
Figure 4B:
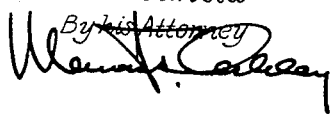

Accordingly, the rectified output voltage of the thyratron rectifiers 10 and 12 may be varied through a wide range from substantially zero to a predetermined maximum value by controlling the flow of direct current in the saturating winding 52 of the reactor 34. The effect on rectification is illustrated in Figs. 2b, 3b and 4b which are voltage-time graphs representing the operation of one Thyratron rectifier for the several conditions illustrated in Figs. 2a, 3a and 4a respectively. According to the characteristics of Thyratrons and similar tubes, as aforementioned, the flow of plate current is governed at the outset by the application to the control grid of a voltage equal to or exceeding a critical voltage and thereafter the effect of grid voltage on the conduction of the tube disappears. For every value of anode voltage there is a critical firing or conduction voltage which must be applied to the control grid before current will flow initially. With a sinusoidal anode voltage wave, such as in Fig. 2b, the critical grid-voltage wave may be illustrated as indicated by the dotted line and the point $t$ of time at which the sinusoidal grid voltage intersects the critical grid-voltage wave is the point at which conduction commences in the tube. The amount of conduction is indicated graphically by the shaded area under the positive portion of the sinusoidal anode-voltage wave. This portion increases or diminishes respectively in accordance with the decrease or increase of the leading phase angle of the grid-voltage wave relative to the anode-voltage wave. It will be seen that, for substantially all points in the range of possible variations of the initial conduction time $t$, the grid-voltage wave has a favorable aspect at its intersection with the critical grid voltage of the tube, that is, the intersection always occurs at an appreciable acute angle. The angle may be increased by increasing the amplitude of the grid voltage for even more favorable operation and more positive control of the point of conduction, so that fluctuations in amplitude of either wave will have little effect on the amount of rectification in the tube.

In providing for the automatic regulation of the rectifiers 10 and 12, a portion of the rectifier-output voltage is utilized to control a direct current in the saturating winding 52 of the saturable reactor 34. This is accomplished in the illustrated embodiment of the invention by means of an amplifier circuit which is responsive to a control voltage comprising a portion of said rectified output voltage. The control voltage is derived from a variable resistor 54 of a resistance divider network additionally comprising a fixed resistor 56, the network being connected across the lines 24 and 26. This control voltage may be filtered, as by means of a condenser 55 before application to the control grid of an amplifier tube 58, the anode-cathode current of which flows through the saturating winding 52 of the saturable reactor 34. A constant bias, or reference, voltage to which the control voltage may effectively be compared in controlling the operation of the amplifier is applied to the cathode of the amplifier tube 58 by means of a constant voltage gaseous discharge tube 60 which may be any suitable voltage regulator tube, or combination of tubes, depending upon the magnitude of the reference voltage desired. A constant voltage discharge is maintained in the tube 60 by means of a separate source of direct current comprising a secondary winding 62 of the transformer 38, a rectifier 64 and a filter including a series resistor 66 and shunt capacitors 68. A resistor 70 is provided in series with the tube 60 for the purpose of permitting variations in current therethrough without disturbing the constant voltage discharge condition, as is customary with such tubes. Anode supply voltage for the amplifier tube 58 is derived from a resistance divider 72 connected across the output of said separate source having an intermediate point 74 to which one end of the saturating winding 52 is connected, the other end of said winding being connected to the anode of said amplifier tube 58.

In the regulatory operation of the system, it will be apparent that an increase in the average rectified output voltage appearing between the lines 24 and 26 will effect a decrease in the flow of current in the amplifier tube 58 and in the winding 52. When the rectified voltage increases, the permeability of the core of the saturable reactor 34 is also increased which effects an increase in the inductive reactance of the reactor winding 32. Thus, the phase of the grid-voltage wave relative to the anode voltage wave of each of the rectifiers is further advanced, thereby decreasing the conduction of the rectifiers and lowering the output voltage appearing across the lines 24 and 26. The opposite effect occurs when the output voltage tends to decrease. Regulation is achieved by the tendency of the circuit to maintain a constant relationship between the amplifier 58 grid control voltage and the bias or reference voltage at its cathode. When this tends to change, an opposing change in the conduction of rectifiers 10 and 12 is effected to offset said first change by an amount dependent directly upon the gain of the amplifier. Increasing the gain of the amplifier 58 will increase the degree of fineness of regulation in the circuit.

The magnitude of the regulated voltage, i. e. the voltage between the lines 24 and 26, may be varied by changing the setting of the variable resistor 54 which effects a corresponding change in the proportion of the voltage across the resistor 54 relative to the total voltage across the lines. Increasing the resistance value of the variable resistor 54 decreases the rectified output voltage, and vice versa. In this way the voltage applied to the load 27 may be varied over a wide range and for every selected value the circuit will provide close and continuous regulation in accordance with the foregoing. It has been found to be particularly advantageous to employ a separate source of direct voltage for the reference or bias voltage in the cathode of the amplifier tube 58 and for the anode of that tube, not only in respect to the avoidance of drawing variable amounts of current from the lines 24 and 26 as the needs of the regulating circuit change, but also in extending the range of regulated output voltage which may be secured with adjustment of the resistor 54. In connection with the selection of low values of output voltage, were the discharge tube 60 to be supplied from connections extending to the lines 24 and 26, instead of from a separate source as shown, there would be a lower limit imposed upon the voltage producible across these lines since the discharge tube 60 requires a certain minimum voltage to operate satisfactorily. With one typical design of the circuit of Fig. 1 which has been tried it was found possible to select any output voltage between the range of lower than 100 volts to a maximum of over 2,000 volts with entirely satisfactory voltage regulation at all values selected, but this range of voltages could be extended considerably depending upon circuit design.

The resistor 56 and the maximum resistance value of the variable resistor 54 in the specific circuit just referred to were made substantially equal, and the tube 60 employed was a VR-150 type tube. Both resistors were in the order of several megohms, to limit the current drain on the lines 24 and 26 but they could be of any suitable size.

The selection in a particular design of the values of the various circuit elements determining the phase shift of the grid voltage of the thyratron tubes 10 and 12 will be governed in accordance with principles well known to those skilled in the art. For example, in respect to the phase control circuit itself, to achieve maximum phase shift, it will be apparent that the reactor winding 32 preferably should have a low ohmic resistance and its inductive reactance, relative to the resistance value of the resistor 40, should be variable from a low to a very high value with variations in the saturating current in the winding 52. It will be further apparent that other types of rectifiers than thyratrons may be employed without departing from the scope of application of the invention. Any controlled rectifier in which the phase of the control voltage relative to the phase of a current to be rectified determines the amount of rectification may be employed in connection with the invention.

Having thus described my invention, what I claim as new and desire to secure by Letters Patent of the United States is:

Apparatus for regulating a direct voltage converted from an alternating voltage by means of a grid-controlled rectifier tube, comprising, in combination with a grid-controlled rectifier tube, a direct current output circuit supplied by said tube, alternating current supply means for said tube, a control circuit connected to said tube to control the rectifying action thereof for regulating the magnitude of the output voltage, said control circuit including a transformer secondary winding, a resistor and variable inductance means, all three in mutual series connection, means for varying said inductance means in accordance with variations in said output voltage, said latter means comprising a saturating winding, a magnetic core magnetically linked with said inductance means and said saturating winding, and means for producing direct current in said saturating winding to saturate said core to a controlled degree determined in accordance with the magnitude of said output voltage thereby to regulate the latter automatically comprising an amplifier circuit including the following, in combination: an amplifier tube, a grid-cathode circuit for said tube and comprising a constant-voltage gaseous discharge tube, a source of direct current independent of said output circuit for producing a constant-voltage discharge in said gaseous discharge tube for supplying a fixed bias to said amplifier tube; a resistance network across said direct current output circuit, said network including a fixed resistor and a variable resistor connected in series therewith, the voltage across said variable resistor being applied to the control grid of said amplifier tube in opposition to said fixed bias to provide a variable bias determined by the magnitude of the output voltage; an anode-cathode circuit for said amplifier tube, said latter circuit including said saturating winding and a source of electric energy independent of said output circuit, the arrangement being such that the current in said saturating winding and thus the magnitude of the voltage of said output circuit may be varied by means of said variable resistor thereafter to be regulated automatically.

CARL JUHOLA.

REFERENCES CITED

The following references are of record in the file of this patent:

UNITED STATES PATENTS

| Number | Name | Date |
|---|---|---|
| 1,893,766 | FitzGerald | Jan. 10, 1933 |
| 1,944,072 | FitzGerald | Jan. 16, 1934 |
| 1,995,404 | Stoller | Mar. 26, 1935 |
| 2,019,328 | Thompson et al. | Oct. 29, 1935 |
| 2,083,382 | Jutson et al. | June 8, 1937 |
| 2,084,900 | Edwards | June 22, 1937 |
| 2,195,121 | Moyer | Mar. 26, 1940 |
| 2,196,680 | Milarta | Apr. 9, 1940 |
| 2,259,119 | Stoehr | Oct. 14, 1941 |
| 2,315,619 | Hutcheson et al. | Apr. 6, 1943 |
| 2,325,092 | Andrews | July 27, 1943 |